(12) United States Patent
Dinker et al.

(10) Patent No.: US 7,024,483 B2
(45) Date of Patent: Apr. 4, 2006

(54) SYSTEM AND METHOD FOR TOPOLOGY MANAGER EMPLOYING FINITE STATE AUTOMATA FOR DYNAMIC CLUSTER FORMATION

(75) Inventors: Darpan Dinker, San Jose, CA (US); Mahesh Kannan, San Jose, CA (US); Pramod Gopinath, Union City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 666 days.

(21) Appl. No.: 10/134,956

(22) Filed: Apr. 29, 2002

(65) Prior Publication Data

US 2003/0204273 A1    Oct. 30, 2003

(51) Int. Cl.
*G06F 15/16* (2006.01)
(52) U.S. Cl. .................... 709/227; 709/204
(58) Field of Classification Search ........... 709/227, 709/204, 205; 706/15; 700/49, 48
See application file for complete search history.

(56) References Cited

U.S. PATENT DOCUMENTS

| | | | |
|---|---|---|---|
| 5,666,486 A * | 9/1997 | Alfieri et al. ............... | 709/217 |
| 6,108,699 A * | 8/2000 | Moiin ......................... | 709/221 |
| 6,167,490 A | 12/2000 | Levy et al. | |
| 6,192,401 B1 | 2/2001 | Modiri et al. | |
| 6,477,172 B1 * | 11/2002 | Burger et al. ............... | 370/406 |
| 6,567,808 B1 | 5/2003 | Eschelbeck et al. | |
| 6,718,394 B1 | 4/2004 | Cain | |
| 6,748,429 B1 * | 6/2004 | Talluri et al. ............... | 709/221 |
| 6,801,937 B1 | 10/2004 | Novaes et al. | |
| 6,847,993 B1 * | 1/2005 | Novaes et al. ............. | 709/221 |
| 2002/0042693 A1 * | 4/2002 | Kampe et al. ............. | 702/186 |
| 2003/0204509 A1 | 10/2003 | Dinker et al. | |
| 2003/0204623 A1 * | 10/2003 | Cain .......................... | 709/241 |
| 2003/0204786 A1 | 10/2003 | Dinker et al. | |

OTHER PUBLICATIONS

"Gulfstream—a System for Dynamic Topology Management in Multi-Domain Server Farms," Fakhouri et al., in Proc. IEEE International Conference on Cluster Computing (Cluster 2001), Oct. 2001, 8 pages.

"An Overview of the Galaxy Management Framework for Scalable Enterprise Cluster Computing," Vogels, et al., In the Proc. Of IEEE International Conference on Cluster Computing: Cluster-2000, Dec. 2000, 10 pages.

* cited by examiner

*Primary Examiner*—Rupal Dharia
*Assistant Examiner*—Brian J. Gillis
(74) *Attorney, Agent, or Firm*—Robert C. Kowert; Meyertons, Hood, Kivlin, Kowert & Goetzel, P.C.

(57) ABSTRACT

A distributed system provides for separate management of dynamic cluster membership and distributed data. Nodes of the distributed system may include a state manager and a topology manager. A state manager handles data access from the cluster. A topology manager handles changes to the dynamic cluster topology. The topology manager enables operation of the state manager by handling topology changes, such as new nodes to join the cluster and node members to exit the cluster. A topology manager may follow a static topology description when handling cluster topology changes. Data replication and recovery functions may be implemented, for example to provide high availability.

53 Claims, 10 Drawing Sheets

SYSTEM AND METHOD FOR TOPOLOGY MANAGER EMPLOYING FINITE STATE AUTOMATA FOR DYNAMIC CLUSTER FORMATION

BACKGROUND OF THE INVENTION

1. Field of the Invention

The present invention relates to distributed data systems, and more particularly to managing dynamic cluster membership in distributed data systems.

2. Description of Related Art

In distributed data systems, data may be stored in several locations. Such locations may include servers, computers, or other devices with storage devices or access to storage devices. Storage devices may include hard drives, memory, registers, and other media where data can be stored and retrieved. A distributed data system may span a large network or combination of networks, for example on the Internet or a local intranet, or simply involve a plurality of storage devices connected to a computing device. The data may be distributed in blocks of specific sizes, by file, or any fashion according with space constraints of available storage devices.

Cooperating members of a distributed data system may form clusters to provide transparent data access and data locality for clients, abstracting from the clients the possible complexity of the data distribution. FIG. 1 illustrates a distributed data system of nodes 110 forming a cluster 100, each including storage space for distributed data 111. Other nodes may exist that are not part of the cluster. Data for any clients of the cluster nodes 110 may be distributed in the data stores 111 of the cluster nodes 110. Nodes may be servers, computers, or other computing devices. Nodes may also be computing processes, so that multiple nodes may exist on the same server, computer, or other computing device. Communication between nodes forming a cluster may be possible over some connections, for example electrical coupling or wireless connections.

Clustering of nodes may enable load balancing, high availability, and scalability to support client requirements or improve performance. In the event of failure, for example, data backup at multiple locations in a cluster may provide high availability so that data is not lost. Different nodes may be able to provide data or take over tasks for each other. Maintaining high availability generally may involve multiple nodes maintaining redundant data. Redundant data may be maintained by replicating data between nodes, for example between multiple processes of the same or different server, by replicating the data on different servers, or generally by ensuring duplicate data exists in different actual or virtual locations.

Clusters may also be used to address problems of data ownership and data consistency when failures occur in a cluster. A dynamic cluster involves changes in the membership of the cluster over time. Such changes may occur as a result of failures and dynamic cluster membership management involves tracking the membership of a cluster. Failure events may include node failures in a network, unresponsive nodes or processes, process failures, events preventing a node from operating in a cluster, or other events that can lead to a non-functioning cluster. Changes in the cluster may occur when members rejoin or new members join the cluster, affecting the relationship between cluster participants.

One solution for dynamic cluster membership is a centralized master and slave topology, for example as a star topology. However, using a single centralized master and multiple slaves, essentially a star topology with the central node acting as the master, may create a bottleneck. Such a topology may negatively impact scalability, and frequent data updates between master and slaves may result in lower performance. The ability of slaves to get membership information about each other may be limited. The failure of the central node itself may spawn complex computing problems, particularly in the event of multiple node failures. Addressing node failure may include implementing leader elections by remaining nodes, for example.

Topology management may be needed whatever the topology of the distributed system, for example to handle nodes entering or exiting the cluster. Changes in cluster membership or topology may affect access to the distributed data stored in the distributed system. Typically, cluster membership management is handled as an integral part of the distributed data management since membership changes may affect distributed data access and distributed data access may vary depending on topology.

SUMMARY OF THE INVENTION

A system and method are described to provide dynamic cluster membership in a distributed system. Cluster membership and data may be managed separately with, for example, an event notification mechanism between the different management layers. Various systems and methods of managing cluster membership may be implemented. In one embodiment, topology management ensures that the dynamic cluster forms a topology tracking a specified topology arrangement. Various methods and systems may provide for recovery due to the loss of cluster members. In one embodiment, data replication may be implemented to provide high availability. Functions for data replication, communication, or other operations desired for the distributed system may be provided.

In some embodiments of the present invention, node members of the dynamic cluster in the system are configured to form a cluster according to a ring topology. A static topology of the nodes may indicate an ordering of the nodes in the topology. Under normal operation with all nodes active the cluster topology may match the static topology. Otherwise, as may be required by current cluster membership, the cluster topology formed may be a ring topology approaching the static topology. Nodes may have access to information regarding the static topology.

In one embodiment of the present invention, dynamic cluster membership may be handled by a topology manager utilizing a finite state automata. A topology manager may be configured to ensure that the active members of the cluster form a ring and that the current topology matches a static topology to the extent possible given the currently active nodes. The finite state automata may define node functions, operating states, communication, and state transitions. In one emdodiment, the finite state automata may include five membership states and five messages to use for communication between nodes to dynamically effect changes in membership.

Distributed data management may be handled by a state manager. A state manager and a topology manager may interact, for example to handle topology changes or access to data in the distributed system. In one embodiment, a topology manager may abstract from a state manager implementation details of the dynamic cluster membership management. An interface may be defined between a distributed data management and a state manager for interaction between the two managers. The interface may provide a standard to enable one or more different state managers and one or more different topology managers to operate together to implement a distributed system.

In one embodiment, a clustered distributed data system may include a plurality of nodes in a cluster. A new node may connect to a node in the cluster and send a connect request message to that cluster node. The cluster node may send a node joined message through the cluster to another node in the cluster. The other cluster node may connect to the new node and send it a connect complete message. The new node may then sending a first connect complete message to the cluster node with which it first connected. All nodes may then function as cluster members, with the new node having as neighbors in the topology the cluster node with which a connection has been established.

In one embodiment, a first node for a clustered distributed data system may operate in connecting state, attempting to connect to a second node of a plurality of cluster nodes as its next node. The plurality of cluster nodes may be connected together to form a distributed data cluster having a topology order. Upon connecting to the second node, the first node may transition to joining state and send a connect request message to the second node. The first node may then wait in the joining state to receive a connect complete message. If the first node receives a connect reject message, the first node may return to connecting state and attempt to connect to another node of the plurality of cluster nodes as its next node, for example to another node indicated by the connect reject message. The second node may be connected to a third node as its next node according to a cluster topology. The second node may receive the connect request message from the first node. Upon determining that the first node may become its previous node, the second node may transition to a transient state and send a node joined message to its next node to indicate that the first node is joining the distributed data cluster. Otherwise, the second node may send a connect reject message to the first node. The second node may wait in transient state to receive a connect complete message from the first node.

In this embodiment, the third node may receiving the node joined message indicating the first node is attempting to join the distributed data cluster and determine that the first node is attempting to connect to the cluster as its next node. The third node may connect to the first node and sending the first node a connect complete message. Upon receiving the connect complete message from the third node, the first node may connect to the third node as its previous node, send a connect complete message to the second node, and transitioning to a joined state as a member of the distributed data cluster. Upon receiving the connect complete message from the first node, the second node may transition to the joined state and connect to the first node as its previous node in the cluster topology order. In the joined state, the first node may be a member of the distributed data cluster in the topology order between its previous node, the third node, and its next node, the second node.

While the invention is described herein by way of example for several embodiments and illustrative drawings, those skilled in the art will recognize that the invention is not limited to the embodiments or drawings described. It should be understood that the drawings and detailed description are not intended to limit the invention to the particular form disclosed but, on the contrary, the intention is to cover all modifications, equivalents, and alternatives falling within the spirit and scope of the present invention as defined by the appended claims. The headings used are for organizational purposes only and are not meant to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF THE INVENTION

Figure 1:
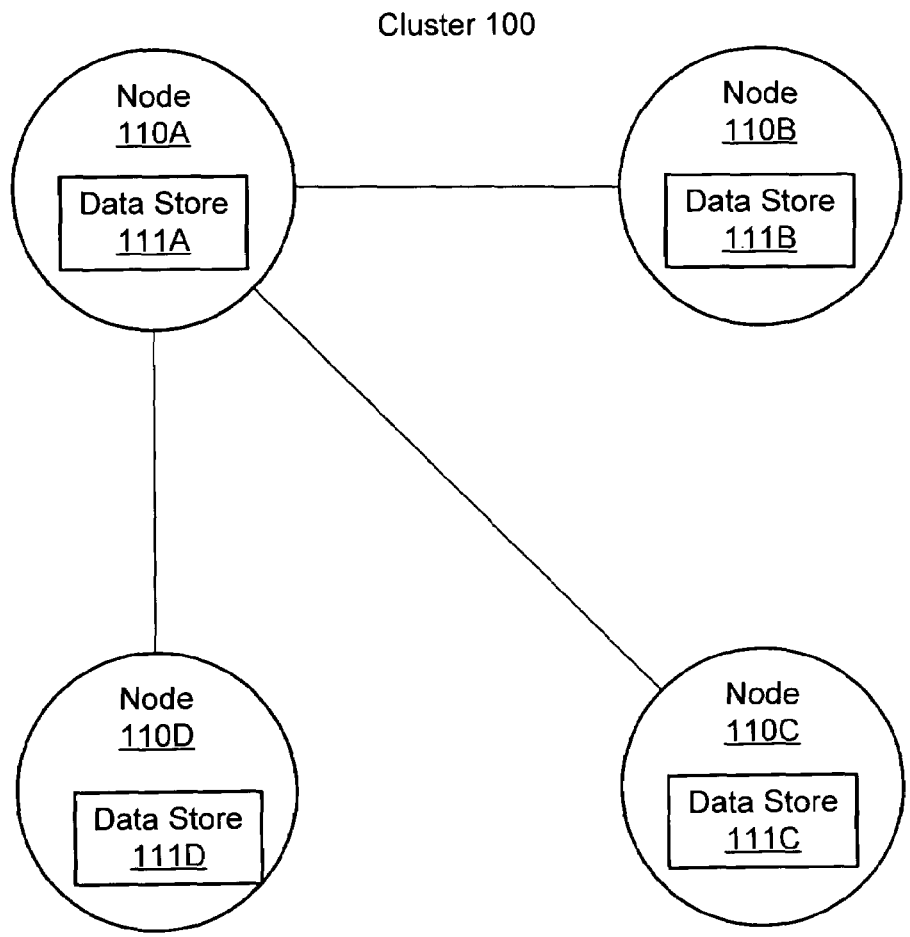
FIG. 1 illustrates a distributed data system of nodes forming a cluster, each including access to storage space for distributed data.
Figure 2:
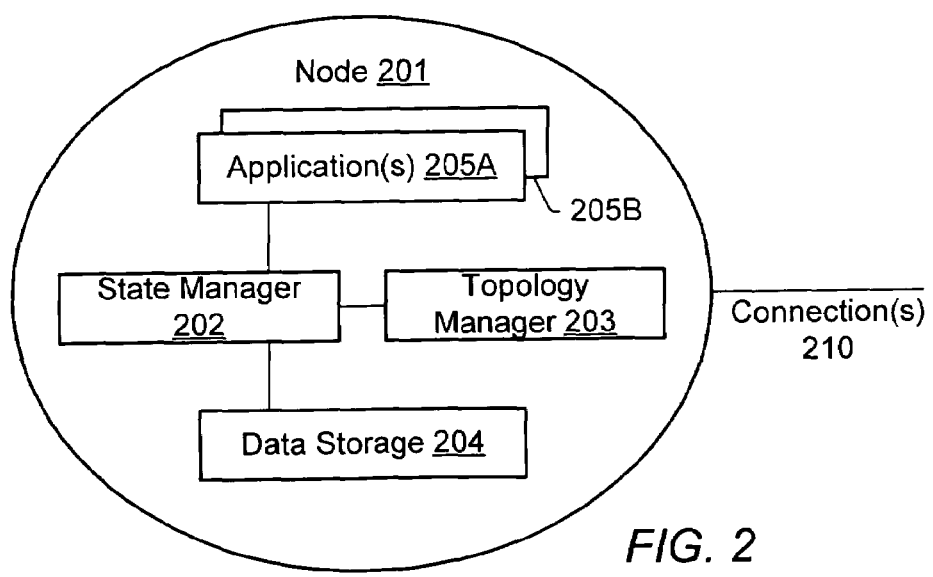
FIG. 2 illustrates a node including one or more applications, access to data storage, a state manager, and a topology manager, according to one embodiment.

FIG. 2 illustrates a node 201 including one or more applications 205, access to data storage 204, a state manager 202, and a topology manager 203, according to one embodiment of the present invention. Nodes may be servers, computers, or other computing devices. Nodes may also be computing processes, so that multiple nodes may exist on the same server, computer, or other computing device. An application 205A may access the distributed data system through the state manager 202 at the same node 201. The data to be distributed in or to be retrieved from the cluster for an application 205 may be any data that may be stored on accessible data storage devices. In one embodiment a node may respond to requests for access to a distributed system from applications in other nodes. A cluster member and its elements, such as the topology manager 203 and state manager 202, may communicate with other nodes of the cluster through connections 210. Communication may take place through communication interfaces of the respective nodes coupled to connections 210. Communication between members of a cluster may be through a particular protocol, for example TCP/IP.

A state manager 202 may handle management of distributed data stored in a cluster of nodes. A topology manager 203 may handle cluster membership management. The state manager 202 and topology manager 203 of a node may communicate between each other. A standard interface may be implemented between the state manager 202 and the topology manager 203. To ensure that the state manager 202 has data about the cluster, the topology manager 203 may send event notifications to the state manager 202 that indicate changes in the topology. For example, the topology manager 203 may send an event notification to the state manager 202 when a node joins the cluster, when a node leaves the cluster, or when another event affecting the cluster topology occurs. An implementation of a topology manager 203 and a state manager 202 may include the topology manager 203 as a layer of a layered cluster manager, as part of some application, operating system, software, or as hardware. An embodiment may include the topology manager 203 and state manager 202 functioning as layers of a single program or element.

The state manager 202 may manage data stored in a cluster for its node or other nodes in the cluster. The state manager 202 may access distributed data either from locally accessible data storage 204 or from other members of a cluster through connections 210. The state manager 202 may be responsible for ensuring that data stored on or generated by node 201 is replicated on one or more other nodes in the cluster. The nodes from which state manager 202 may retrieve or store data may change in response to event notifications from the topology manager 203 to maintain certain properties of the cluster or data distribution. For example, the topology manager 203 may notify the state manager 202 that a node has joined the cluster. The state manager 202 may then access data from its locally accessible data storage 204 and may store that data on the new node in the cluster through connections 210. The state manager may access or retrieve data differently depending on different message received from the topology manager to ensure continued data availability. Event notifications from the topology manager 203 may affect to which node the state manager 202 replicates data, for example. A state manager 202 may receive data from other cluster nodes through connections 210 for local storage.

Figure 3:
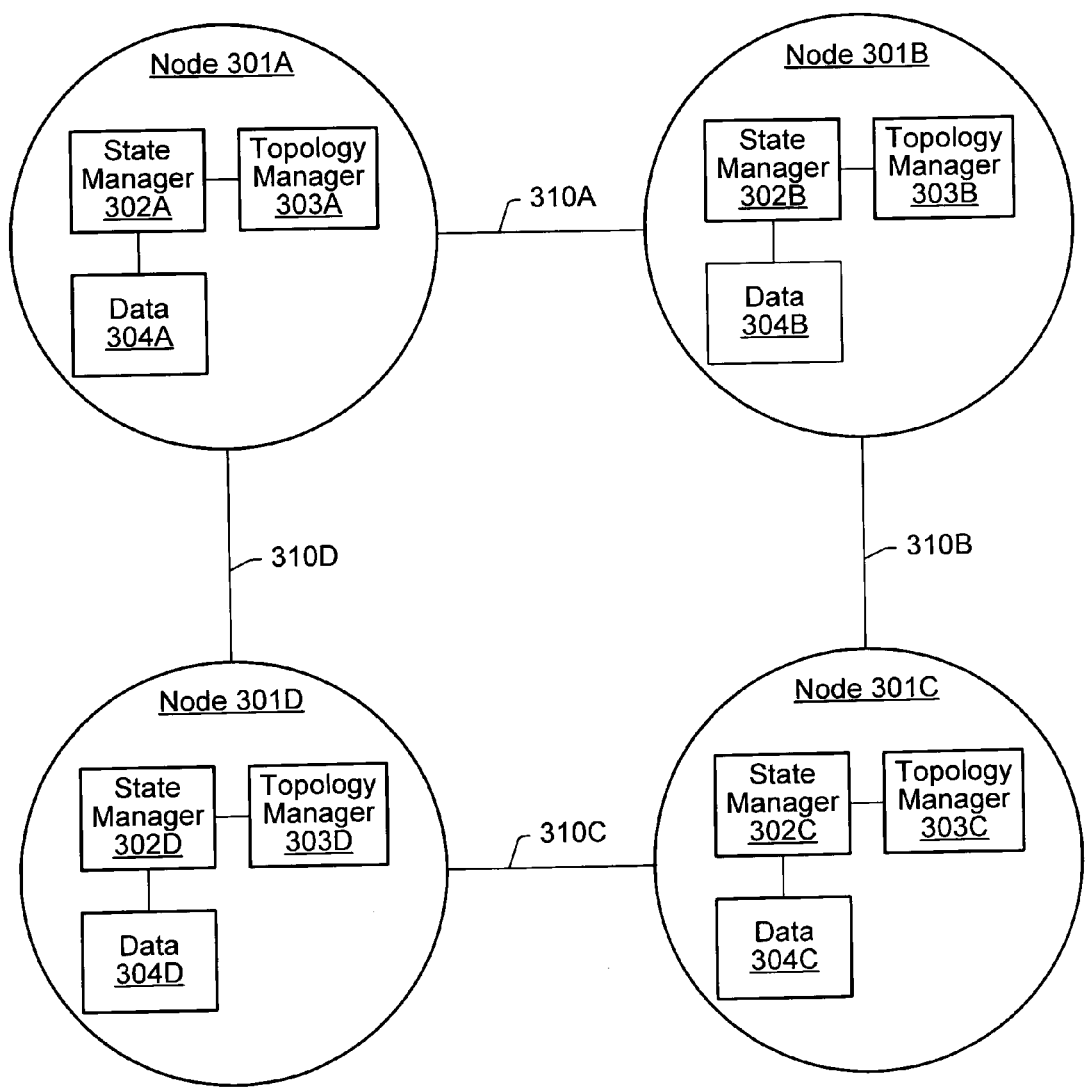
FIG. 3 illustrates a cluster of nodes configured as described in FIG. 2, according to one embodiment.

The topology manager 203 may maintain a data structure (e.g. a topology table) indicating at least part of the topology of the cluster. In a ring cluster, one of a node's 201 two immediate neighbors may be its next node and the other its previous node. The topology manager 203 for node 201 in a cluster may include information regarding its node's 201 next node and previous node in the cluster, for example as illustrated in FIG. 3. Node 201's neighbors may not be physical neighbors but virtual neighbors. For example, two adjacent nodes in a topology might not be physically located adjacent to each other. In one embodiment, each node is its next node's previous node and its previous node's next node in a ring cluster.

The topology manager 203 may access a static topology including a particular ordering of nodes. Nodes in a cluster may share the same static topology. The topology manager 203 may operate to ensure that under normal operation with all nodes active the cluster topology matches the static topology. Otherwise, as may be required by current cluster membership, the cluster topology formed may be a topology approaching the static topology. Topology manager 203 may participate in mechanisms for handling dynamic node additions to and node departures from the cluster so that the current topology closely follows the static topology. For example, a topology manager 203 may ensure that nodes currently in the cluster are connected in a similar order to that described by the static topology to the extent possible in light of nodes joining and/or leaving the cluster. For a static topology describing the order for nodes as B-F-C-D-A-E, then with only nodes A, B, and D active a matching cluster topology is B-D-A, for example. The static topology may be based on or refer to node identifiers, addresses, or any other suitable node identifier. The static topology may include address or connection information for some nodes.

FIG. 3 illustrates a cluster of nodes 301 each configured as described in FIG. 2. Each node includes a state manager 302, a topology manager 303, and access to data store 304 for storing distributed data. Nodes in the cluster may communicate between each other through connections 310. As shown in FIG. 3, the cluster forms a ring topology.

Figure 4:
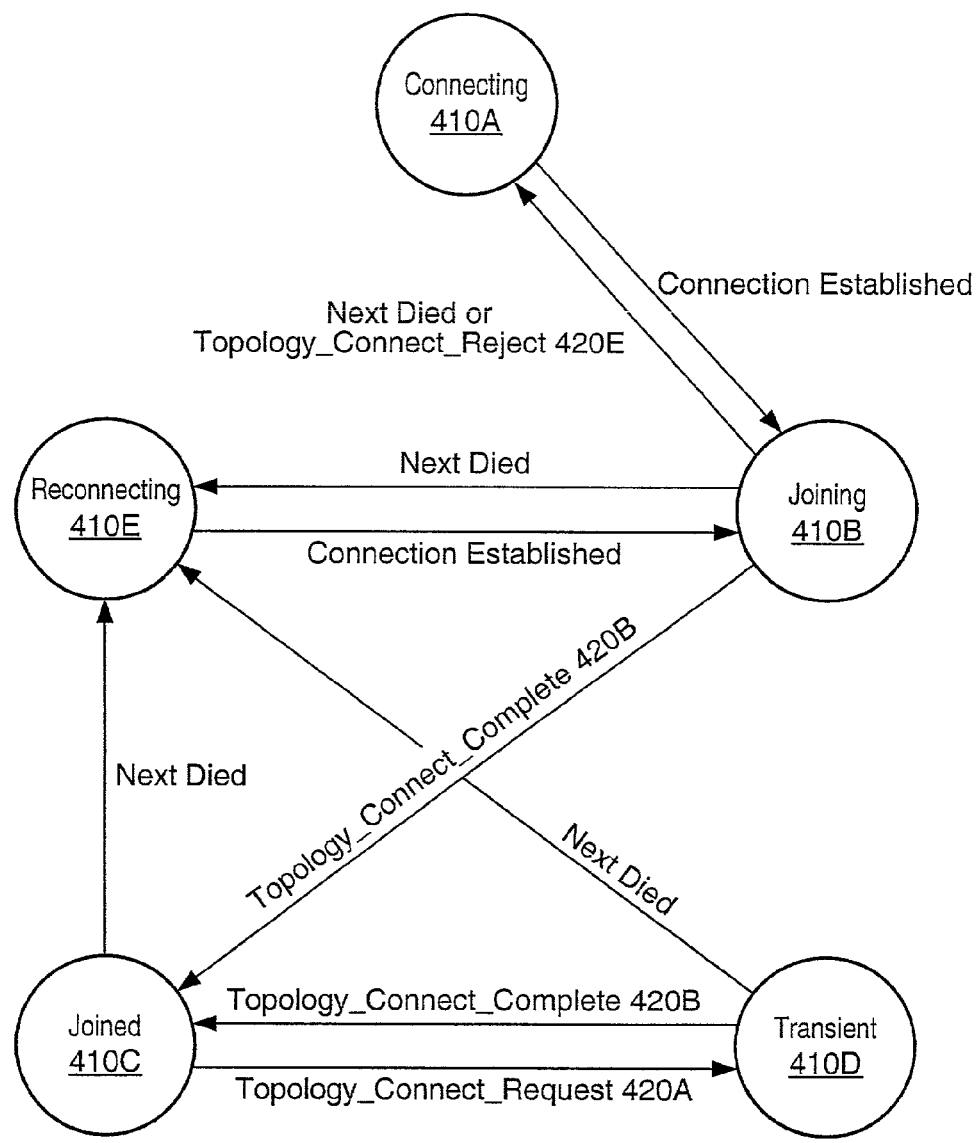
FIG. 4 illustrates a state diagram for topology management that may be implemented by a topology manager in one embodiment.

The topology manager 203 as illustrated in FIG. 2 may function according to a finite state automata to handle dynamic cluster membership. In one embodiment the finite state automata includes five states, as illustrated in FIG. 4. The topology manager 203 may operate in one of the states 410 at a given time—connecting state 410A, joining state 410B, joined state 410C, transient state 410D, and reconnecting state 410E—to manage changes in cluster membership.

In connecting state 410A, a node 201 may attempt to establish a connection with another node in a cluster in order to join the cluster. A connecting state 410A may indicate that the corresponding node in the connecting state is not currently part of the cluster. A node 201 may first operate (e.g. boot-up) in connecting state 410A. A node in connecting state 410A may continue its connection attempts until a connection is established or some condition occurs, for example if attempts to connect to all known nodes have failed. Connection to other nodes may be attempted in succession, typically in a repeating order, in a search for a node with which a connection can be established. The order in which a node in connecting state 410A attempts to connect to other nodes may be according to an order of nodes described by a static topology for the cluster. In one embodiment, all nodes that are or may be part of one cluster share the same method or system for selecting the connection order. For example, a node seeking to join the cluster may attempt to connect to the node indicated by the static topology to be its next node. If a connection cannot be established to that node, the node attempting to join may attempt to connect to the next node according to the static topology (its next next-node).

A node 201 that has established a connection to a cluster node transitions to joining state 410B and may attempt to become a member of the cluster by requesting to join the cluster as the previous node in the topology for the node to which it connected. The node in joining state 410B may communicate with the cluster node to which it is connected to request membership in the cluster. While in joining state 410B, a node may receive a message from a node that has connected to it as its previous node indicating that the joining process is complete.

In joined state 410C, a node 201 is part of a cluster. In a ring cluster a node in joined state 410C may have two immediate neighbors in the topology, a next node and a previous node. A node that is the only node in the cluster may be considered to be its own previous and next node. For example, a node that comes up in connecting state 410A and is unable to connect to any other node as specified in the static topology, may transition to joined state 410C as the first active node of the cluster. Similarly, if there are only two active nodes in the cluster, each node will be both the previous and next node for the other node. A node 201 in joined state 410C may communicate to at least one of its neighbors in the topology indications of changes in the topology. For example, in joined state 410C, a node 201 may receive from its previous node in the topology a message indicating a new node has joined the topology and may send to its next node in the topology a message indicating a new node has joined the topology. Similarly, a node 201 in joined state 410C may communicate a message indicating the failure of a node in the topology.

The topology manager 203 and state manager 202 of a node in joined state 410C may function together to enable data distribution and associated operations. For example, the topology manager 203 may send notifications to the state manager 202 regarding events affecting the topology.

A node 201 may transition to transient state 410D when it receives a request from another node to join the cluster. A cluster node 201 in transient state 410D may respond to a node seeking membership in the cluster and may reject or ignore subsequent requests while in this state to avoid conflicting requests. The node in transient state 410D may communicate information to the rest of the cluster to indicate the topology connection request of the new node. A node may reject the topology connection request of the new node. For example, the node receiving the request may verify that the requesting node is the correct node for it to be connected to according to the static topology and current cluster membership. If the node is not connecting in the correct order (according to the static topology and current cluster membership), then the node receiving the request may reject the request. In some embodiments, the rejection may include an indication of the correct node for the requesting node to connect to. In transient state 410D, a node 201 may send messages rejecting connection requests to the cluster subsequently received from other nodes while in transient state 410D. A node may return to its prior state from the transient state when it receives an indication that the joining process is complete.

A cluster node 201 may transition to reconnecting state 410E when it has lost its next node in the topology. In reconnecting state 201, the node may attempt to reconnect to a cluster by connecting to a next node. For example, a node 201 in joined state 410C may detect or receive data indicating the failure of its currently connected next node, prompting it to enter reconnecting state 410E. The cluster node 201 in reconnecting state 410E may follow procedures similar to those followed by a node in connecting state 410A to find and connect to another next cluster node. A cluster node 201 in reconnecting state 410E may reconnect to the node with which it lost the connection that prompted it entering reconnecting state 410E, as appropriate to maintain a specified topology; for example if the failure was transitory. If not able to reestablish the lost connection, it may continue to attempt connecting to a next node, for example, according to the static topology.

A topology manager for a node may transition from one state to another in response to events or conditions affecting its status in a cluster or changes to the cluster topology. Such events or conditions may include: establishing a connection to a member of a cluster, the addition of a node to the cluster, receiving a request to join the cluster from another node, or a cluster node failing and no longer being able to operate in the cluster. A node 201 may transition from one state to another in response to a message communicated by another node. Whether or not a node 201 transitions from one state to another in response to a communication from another node, a node 201 may be configured to perform certain operations in response to information included in the received communication.

The topology manager 203 as illustrated in FIG. 2 may communicate to handle dynamic cluster membership using certain types of messages. In one embodiment the topology manager 203 may be configured to use the following messages: a topology_connect_request message, a topopology_connect_complete message, a topology_node_joined message, a topology_node_dead message, and a topology_connect_reject message.

The topology_connect_request message may indicate that the sending node requests to join the cluster. In one embodiment, the topology_connect_request message may indicate that the sending node requests becoming the previous node in the cluster topology of the receiving node. The topology_connect_request message may be sent by a node in or upon transition to joining state 410B to the cluster node to which it connected in connecting state 410A or reconnecting state 410E. A node receiving a topology_connect_request message may transition to transient state 410D in response to receiving the topology_connect_request message. The topology_connect_request message may include information identifying the sending node.

The topology_connect_reject message may indicate an objection to a requested topology change, for example if the topology change indicated conflicts with the static topology. The topology_connect_reject message may be sent from a node objecting to a message indicating a topology change received from another node. For example, a topology_connect_reject message may be sent in response to a connection request in an incorrect order according to the static topology. The topology_connect_reject message may be sent to the node initiating the topology change. The topology_connect_reject message may include data indicating an alternate topology change. For example, a cluster node receiving a topology_connect_request message from a new node may send a topology_connect_reject message to the new node indicating another cluster node to which the new node should connect.

The topology_node_joined message may indicate a topology change for including a new node to the cluster. A node in transient state 410D that received a topology_connect_request message may send a topology_node_joined message to its next node for other members of the cluster to reflect the change in topology. A cluster node receiving the topology_node_joined message from its previous node may forward it or may generate and send another topology_node_joined message to its next node. The topology_node_joined message may be amended by the sending node to add topology data, for example by adding a reference to itself at the end of an ordered list of nodes transmitting the topology_node_joined message. Each node receiving the topology_node_joined message may update its topology table accordingly.

The topology_connect_complete message may indicate that the nodes in the cluster have adopted a cluster topology indicated by a topology_node_joined message. For example, a node may receive a topology_node_joined message indicating that it has a new next node. The node having a new next node may form a connection with its new next node and send a topology_connect_complete message to its new next node (which may be in joining state 410B seeking membership to the cluster). The node in joining state 410B may forward the (or send another) topology_connect_complete message to its next node with which it connected in preceding connecting state 410A or reconnecting state 410E so that its next node knows that its joining is complete. The topology_connect_complete message may include data indicating the topology of the cluster for the receiving node to use. The data indicating the topology of the cluster may be derived from a topology_node_joined message or from the topology data of a cluster node.

The topology_node_dead message may indicate that a cluster node or connection has failed. A failure may include a node itself failing or becoming unresponsive, a loss of connection, interference with communication, or other events preventing a node from operating in a cluster. A cluster node may detect the failure of another cluster node. For example, a cluster node may detect the failure of its previous node or its next node and send a topology_node_dead message to its next node or previous node to indicate to other cluster members the change in cluster topology. The topology_node_dead message may include data identifying which node has failed. When a node in a ring topology fails, both its previous node and next node may send topology_node_dead messages in opposite directions around the topology.

In other embodiments, topology manager 203 may implement other or additional finite state arrangements and/or messages from those described above, for example using more states or with different state transitions, to manage cluster membership as topology events occur. Some operations that may be described for one state may be rearranged from one state to another state while still enabling a topology manager 203 to handle dynamic cluster membership through the finite state machine. In one embodiment, the topology manager 203 may communicate to handle dynamic cluster membership using different types of messages or a different number of messages to handle similar or different conditions. For example, a topology_node_ping message may be used to verify a node after detecting a failure before sending out a topology_node_dead message. A node detecting the failure of its next node may send a topology_node_ping message to either its previous node or its next node and wait a specified time to receive it after traveling around the cluster before sending a topology_node_dead message. All topology managers in a cluster may implement identical or at least compatible finite state mechanisms. Transition from state to state in the state automata of the topology manager 203 may occur depending on different conditions to accomplish the same purpose of managing cluster membership.

As shown in FIG. 4, a topology manager 203 may transition from connecting state 410A to joining state 410B to reflect that its node 201 has established a connection to a cluster node. A connection may be considered established upon connection itself or after the exchange of some messages using that connection between the nodes according to a communication protocol. The topology manager 203 may transition from connecting state 410A to other states, for example to joined state 410C in response to determining that no other nodes are active.

Connecting state 410A may be the default state in the finite state machine for the topology manager 203. Initialization of the topology manager 203 may take place in connecting state 410A, including variables, data structures, connections, hardware, or software. The topology manager 203 may also determine a static topology as supplied by a system administrator, or from hardwired information, or from information received from another element of the node or connected systems, or from data stored in some location. A node identifier, address, or other reference may be determined for the node 201 while it is in connecting state 410A. After establishing a connection in connecting state 410A, and before or upon entering joined state 410C, the node 201 may then consider the node to which it connected its next node in the cluster topology.

As illustrated in FIG. 4, the topology manager 203 may transition to joining state 410B from connecting state 410A or reconnecting state 410E, after a connection to a cluster node has been established to try and request cluster membership through that connection. The node 201 in or upon transitioning to joining state 410B may send a topology_connect_request message to the node with which it connected to request membership into the cluster. Rejection and approval of requests from nodes to join a cluster may be based on whether their insertion at the requested point in the cluster topology conforms with a static topology of the cluster, ensuring that the static topology ordering is maintained as nodes are added to the cluster. If the node 201 in joining state 410B receives a topology_connect_complete message 420B, indicating it is now part of the cluster topology, it may transition to joined state 410C to operate as part of the cluster. If the node 201 in joining state 410B receives a topology_connect_reject message 420E, indicating that its requested insertion in the cluster topology is not approved, or if it receives no response within some time limit, or if the connection is lost or the node with which it connected fails, the node 201 may consider its insertion in the topology at least incomplete. The node 201 in joining state 410B may then transition to connecting state 410A or reconnecting state 410E, depending on whether it was previous a member of the cluster, to continue to try joining the cluster by establishing a connection to a cluster node so it may return to joining state 410B to request cluster membership through that connection. A topology_connect_reject message 420E received may indicate a correct cluster node for which connection should be established to join the cluster.

Some time after the node 201 in joining state 410B sends a topology_connect_request message 420A to the cluster node with which it connected, the new previous node for the node in joining state 410B may form a connection to complete the new cluster topology that includes the node 201 in joining state 410B. If the cluster previously had only one member, that cluster node connecting to the node 201 in joining state 410B is the cluster node with which the node 201 in joining state 410B connected. Otherwise, the cluster node connecting to the node 201 in joining state 410B may be the previous node of the node with which the node 201 in joining state 410B connected, so that the node 201 in joining state 410B is inserted in the topology between two cluster nodes adjacent in the cluster topology. The cluster node connecting to the node 201 in joining state 410B may send the topology_connect_complete message 420B through the new connection to indicate to the node 201 in joining state 410B that it is a member of the cluster.

The node 201 in state joining 410B may use data included in the received topology_connect_complete message 420B to ensure it has accurate data regarding the cluster topology. To ensure that the node with which it connected is informed of the completed topology change and the current topology, the node 201 in state joining 410B may send a topology_connect_complete message 420 to the cluster node with which it connected. Upon obtaining confirmation of its status as a member of the cluster in joining state 410B, the node 201 may transition to joined state 410C to operate as a member of the cluster.

As shown in FIG. 4, a node may transition to joined state 410C from joining state 410B or transient state 410D after receiving information indicating that the topology change is complete, for example by receiving a topology_connect_complete message 420B. The node 201 in joined state 410C may operate as a member of the cluster and be configured to respond to queries from or provide information to a state manager 202 regarding the cluster. In some embodiments, in states other than joined state 410C, the topology manager 203 may not respond or may respond differently to similar queries from the state manager 202. In one embodiment, a topology manager 203 in transient state 410D may interact with the state manager 202 as it would in joined state 410C.

The cluster node 201 in joined state 410C may receive a topology_node_joined message 420C from another cluster node indicating that a node has requested membership in the cluster, and thus that the topology is changing. The node 201 in joined state 410C may change its topology data to ensure it matches topology change data included in the topology_node_joined message 420C. If the topology change affects the connections of cluster node 201 in joined stated 410C, the cluster 201 in joined state 410C may alter its connections. For example, node 201 may receive from its previous node a topology_node_joined message 420C originating from its next node, indicating that another node seeks to replace node 201 as its next node's previous node. Node 201 may then connect to the node indicated in the topology_node_joined message 420C and send it a topology_connect_complete message 420B to change the topology to include the new node. The topology_connect_complete message 420B sent may include topology information regarding the cluster and may be derived from topology information included in the received topology_node_joined message 420C. Otherwise, if the cluster node 201 does not need to alter its connections, the cluster node 201 may send a topology_node_joined message 420C to another cluster node. In one embodiment, the node 201 in joined state 410C receives a topology_node_joined message 420C from its previous node and sends to its next node a topology_node_joined message 420C. The node 201 in joined state 410C may send an amended version of the topology_node_joined message 420C it received, for example with additional data indicating itself as a member of the cluster topology. For example, each node in turn may append its node ID to the topology table of the topology_node_joined message. When the joining node receives this table with the topology_connect_complete message it will have a complete topology table for the cluster.

A cluster node 201 in joined state 410C may receive a topology_connect_request message 420A from a node that connected with it for becoming node 201's previous node within the cluster topology. If changing the topology to have the node as cluster node 201's previous node conflicts with the static topology, node 201 may send it a topology_connect_reject to indicate that it rejects the request. The topology_connect_request message 420A may include data indicating with which node the requesting node may next attempt to connect. Otherwise, the node in joined state 410C may transition to transient state 410D to respond to the request and prevent conflict with subsequent requests. In one embodiment the node 201 in joined state 410C may transition to transient state 410D upon receiving a valid topology_connect_request message.

A cluster node 201 in joined state 410C may detect the failure of its next node and transition to reconnecting state 410E in response to handle the topology change and establish a substitute connection to maintain the cluster operation. A node failure may include a connection failing, a failure of a node itself, or other event occurring that prevents a neighboring node from operating in a cluster. In one embodiment node failure may include failure to respond to communications, for example to heartbeat communications circulated in a cluster to test whether nodes are active or a topology_node_ping message. Nodes may detect the failure of neighboring nodes or may receive data indicating a node failure. The cluster node 201 detecting the failure of its next node may send a topology_node_dead message to its previous node to indicate that a node has failed, affecting the cluster topology. The topology_node_dead message may indicate the dead node in the cluster. In one embodiment a cluster node 201 detecting failure of its previous node may also send a topology_node_dead message to its next node. A topology_node_dead message may include data indicating which way around a ring cluster it should be sent to clarify distribution.

A cluster node 201 in joined state 410C may receive a topology_node_dead message from a neighboring node in the cluster topology indicating a node failure prompting a topology change. The cluster node 201 may update topology data to ensure that it reflects the topology as indicated in the topology_node_dead message received. If the topology_node_dead message received does not indicate that connections of node 201 are affected by the topology change prompted, the cluster node 201 may then send a topology_node_dead message to its other neighboring node in the cluster topology. In one embodiment the routing of the topology_node_dead message by cluster node 201 may depend on data included in the topology_node_dead message node 201 received. Otherwise, the topology_node_dead message received may indicate that connections of node 201 are affected, for example if the failed node indicated is a neighbor of node 201 in the topology. In one embodiment, cluster node 201 may check that its neighbor has failed before proceeding. For example, node 201 may check if it detected a node failure or it may try to contact the alleged failed node, such as by sending a topology_node_ping message. If node 201 has indication that the alleged failed node has not failed, node 201 may propagate a message objecting to that topology change. Nodes receiving the message objecting to the topology change may update their topology information to reflect that a node did not fail if they altered their topology to indicate that that node had failed. Node 201 may follow a similar process if it receives a topology_node_dead message that references node 201 as the failed node in the cluster. In one embodiment, node 201 may send a topology_connect_complete message 420B upon determining that its next node caused the topology_node_joined message 420C to be circulated in the cluster, to indicate that its request for reconnection has been successfully propagated in the cluster.

As shown in FIG. 4, a cluster node 201 may transition to transient state 410D from joined state 410C to handle a request from a node seeking to become node 201's previous node within the cluster topology. Receiving a topology_connect_request message 420A from the requesting node may prompt the transition of node 201. In one embodiment the receiving node 201 may determine whether adding the requesting node as its previous node in the cluster topology would conflict with the static topology of the cluster and, if so, node 201 may send a topology_connect_reject message 420E to the requesting node, indicating which node the requesting node should next attempt to connect (e.g. per the static order), and return to its previous state. In another embodiment node 201 makes this determination before transitioning to transient state 410D, as described above. The node 201 in transient state 410D may send a topology_node_joined message 420C to its next node in the cluster to indicate that the requesting node is its new previous node. The topology_node_joined message 420C may include topology data. The node 201 in transient state 410D may amend its topology data to reflect the topology change. The node 201 in transient state 410D may send a topology_connect_complete message 420B to its next node in the cluster if its next node is also the requesting node that sent the topology_connect_request message 420A, as the cluster would then include only these two nodes and the topology_node_joined message 420C is not necessary since there are no other cluster nodes to notify.

A node 201 in transient state 410D may reject or may ignore any subsequent topology_connect_request message 420A while in that state to prevent competing requests from conflicting or complicating the determination of which requesting node may become node 201's previous node in the topology. The node 201 may hold other topology_connect_request messages 420A as pending to process them after the status of previous requests have been resolved. A node 201 in transient state 410D may send a topology_connect_reject message 420E to any other nodes forming a subsequent connection with it and sending topology_connect_request messages 420A.

A node 201 in transient state 410D may receive from the requesting node a topology_connect_complete message 420B indicating that the changes to the cluster topology prompted by the requesting node are completed. Node 201 in transient state 410D may update its topology data (if not already updated), for example using topology data from the topology_connect_complete message 420B. The node 201 may discontinue the connection with its old previous node after adding the requesting node its new previous node in the topology. The node 201 in transient state 410D may transition to joined state 410C after completing any update of its topology data.

As illustrated in FIG. 4, the node 201 may transition to state reconnecting from joined state 410C or transient state 410D to handle the failure of its next node in the topology by establishing a connection to a cluster node. The node 201 may detect if its next node in the cluster node is disabled, unresponsive, communication connections fail, or its next node is otherwise unable to function in the cluster, and enter reconnecting state 410E in response. A node 201 in reconnecting state 410E may update its topology data to reflect the topology change resulting from the failure of its next node. In one embodiment, the node 201 may send a topology_node_dead message after entering reconnecting state 410D following a similar process as described above in joining state 410C. The node 201 in reconnecting state 410E may attempt to connect to another node in the cluster and may follow a connecting procedure similar to that in connecting state 410A, using the ordering defined by the static topology. The node 201 in state reconnecting 410E may first attempt to connect to its failed next node's next node. The node 201 in state reconnecting 410E may continue to attempt to connect to nodes in the cluster following their order in the static or cluster topology. The node 201 in state reconnecting 410E may stop looking for nodes with which to connect when it establishes a connection successfully or after some event occurs, for example if it can find no other active nodes in the cluster.

The node 201 in state reconnecting 410E may transition to state joining 410B after establishing a connection with another node in the cluster, as illustrated in FIG. 4. In one embodiment the node 201 in state reconnecting 410E may follow a similar procedure as for a node in state joining 410B and transition to joined state 410C when the node 201 has successfully become another cluster node's previous node. For example, the node 201 in state reconnecting 410E may send a topology_connect_request message 420A to the node with which it has established a connection. The node 201 in state reconnecting 410E may then transition to state joined 410C after receiving a topology_connect_complete message 420B from its previous node. In one embodiment its previous node may send a topology_node_joined message 420C instead of a topology_connect_complete message 420B. The node 201 in state reconnecting 310E may remain in or return to state reconnecting 410E if it receives a topology_connect_reject message 420E and may try to connect to other nodes in the cluster. In one embodiment, the topology_connect_reject message 420E may indicate another node in the cluster with which the node 201 in state reconnecting 310E may attempt to connect. The node indicated in a topology_connect_reject message 420E may be the node declared as failed by the node 201 in state reconnecting 310E. The node 201 in state reconnecting 310E may then attempt to reconnect to the node indicated in the topology_connect_reject message 420E.

FIGS. 5A–D and 6A–C illustrate a node 502 joining a cluster 500 of nodes 501 according to one embodiment. Nodes 501 may be in joined state 410C and node 502 may be in connecting state 510A, as described in FIG. 4. Nodes 501 may be connected 510 in a ring topology. For each node 501, one immediate neighbor in the topology may be its previous node and its other immediate neighbor may be its next node. For example, node 501A may consider node 501D its previous node and node 501B its next node, node 501B may consider node 501DA its previous node and node 501C its next node, node 501C may consider node 501B its previous node and node 501D its next node, and node 501D may consider node 501C its previous node and node 501A its next node. The cluster topology may match the static topology given the currently active nodes.

Figure 5B:
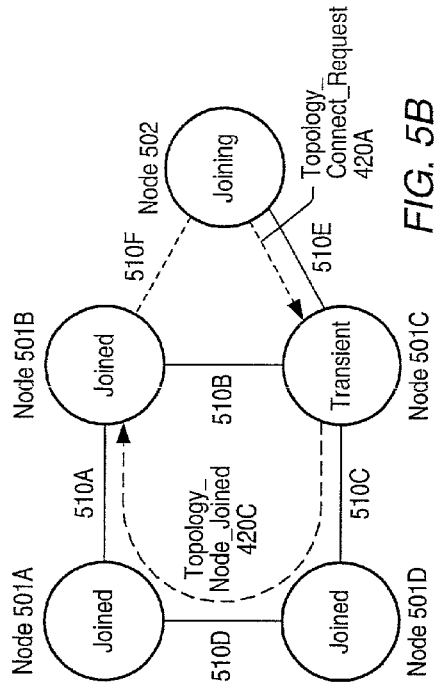
FIG. 5 illustrates a node joining a cluster of nodes, according to one embodiment.
Figure 5D:
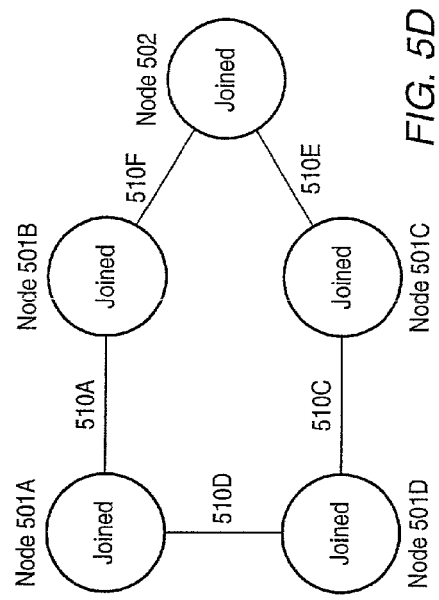
Figure 5A:
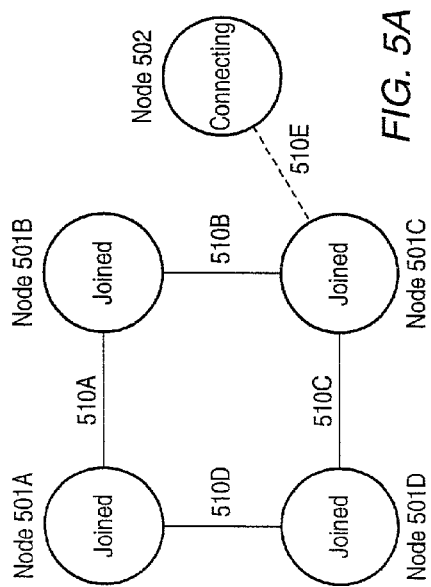

In the example embodiment as shown in FIG. 5A, the node 502 may connect with node 501C as described above for operating in connecting state 410A. Node 502 may establish a connection by opening a TCP/IP socket to node 501C. Node 502 may enter state joining 420B in response to establishing a connection with node 501C to proceed with a request to join the cluster through that connection.

As shown in FIG. 5B, node 502 in joining state 410B, after connecting to node 501C, may send a topology_connect_request message 420A to node 501C to request membership in the cluster, as indicated at 603. Node 501C may transition to transient state 410D after receiving the topology_connect_request message 420A from node 502 to process its membership request. Node 501C may determine whether it should accept node 502 as a neighbor, in particular as a previous node for example, depending on a given static topology and current cluster membership, and proceed as described above if not. Node 501C may send a topology_node_joined message 420C to its next node 501D in the cluster 500 and the message 420C may be communicated in the cluster to reach the node 501B, whose next node is node 501C, as illustrated in FIG. 5B and according to FIG. 4. From the information included with the topology_node_joined message 420C, node 501B recognizes that node 502 should become its new next node. To include node 502 in the cluster topology as the new previous node of node 501C and its new next node, node 501B may establish connection 510F to node 502.

Figure 5C:
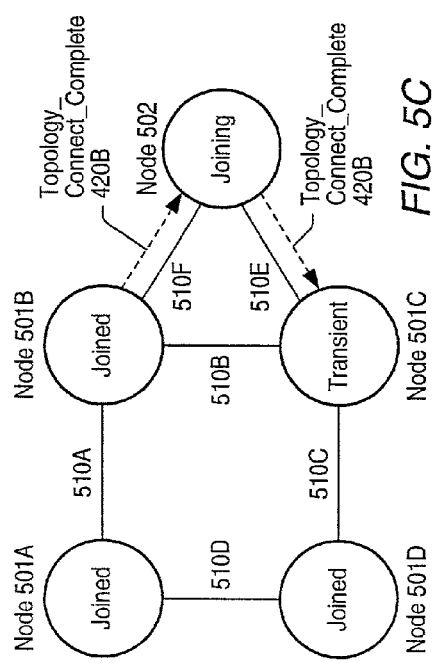

Node 501B may send a topology_connect_complete message 420B through connection 510F, as illustrated in FIG. 5C, to inform node 502 of the cluster topology status. Since node 502 is now a member of the cluster, and replaces node 501B as the previous node of node 501C and node 501C as the next node of node 502B, node 501B may discontinue its connection with node 501C. According to FIG. 4 as described above, node 502 may transition to joined state 410C after receiving the topology_connect_complete message 420B from node 501B and send a topology_connect- _complete message to node 501C to inform it of the cluster status. As described above for transient state 410D, node 501C may then transition to state joined. The new cluster topology is illustrated in FIG. 5D.

Topology events may occur during the process of adding node 502 to cluster 500. For example, a node may die, other node may become members of the cluster, or communication may be disrupted. According to FIG. 4, node 502 in state reconnecting 410E may not establish a connection with node 501C, although that may best fit the static topology for the cluster, for example if node 501C is in transient state 410D to handle a cluster membership request of another node. Node 502 may then instead connect to another cluster node and send it a topology_connect_request message 420A according to operation of reconnecting state as described above. That node may determine that node 502 should connect to node 501C according to the static topology and indicate this information when sending node 502 a topology_connect_reject message 420E. Node 502 may then again attempt to connect to node 501C to conform to the static topology and become node 501C's previous node in the cluster topology. This may continue until node 502 can establish the correct connection.

Figure 6A:
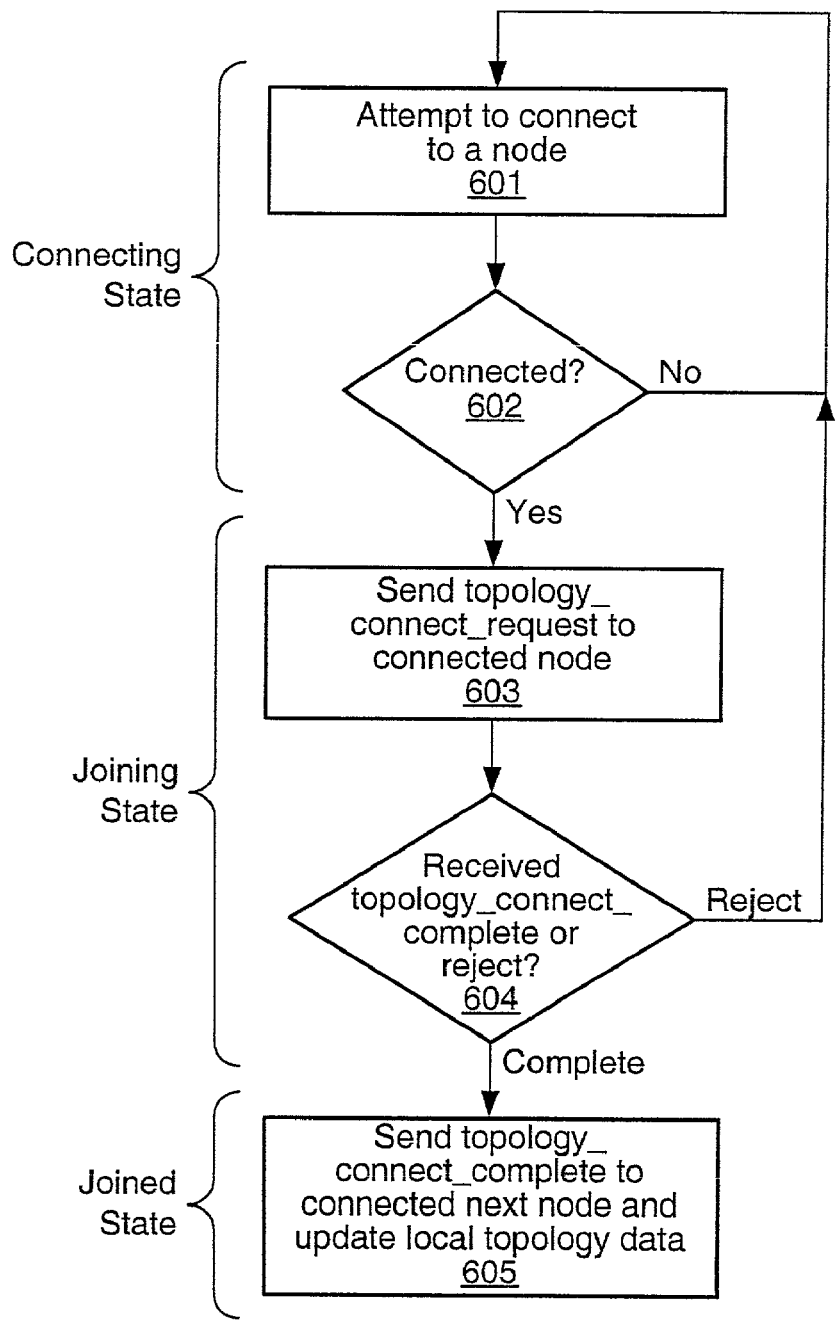
FIG. 6 is a flow chart illustrating a node joining a cluster of nodes as illustrated in FIG. 5, according to one embodiment.
Figure 6B:
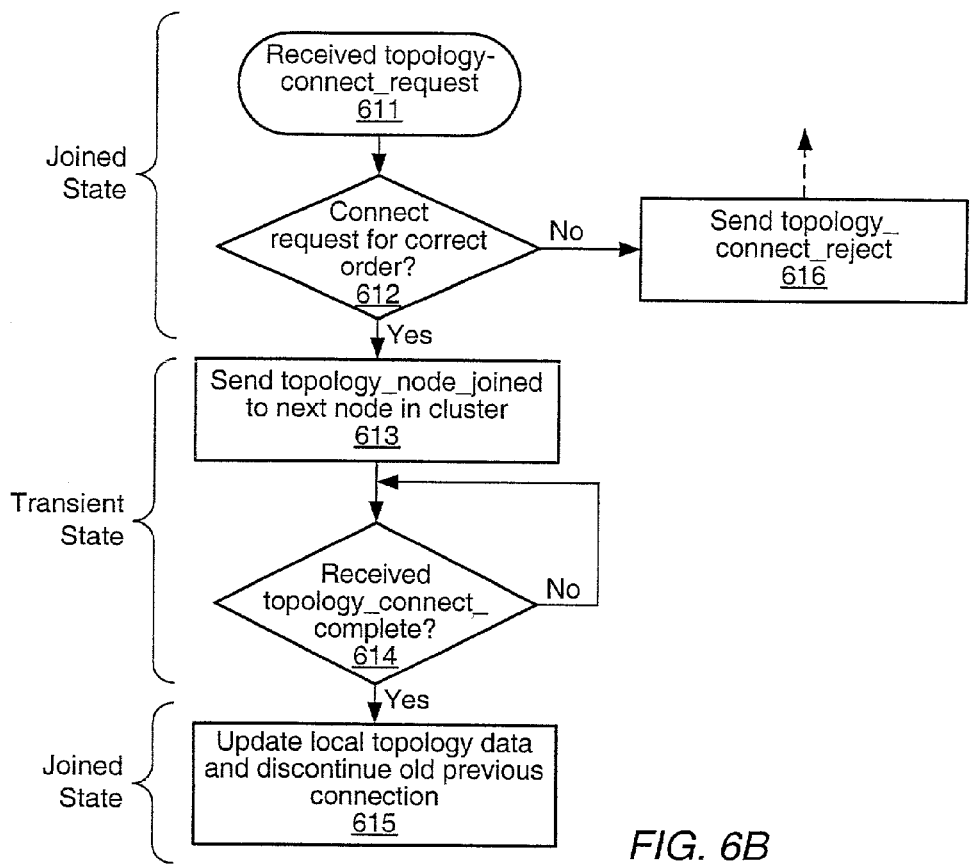
Figure 6C:
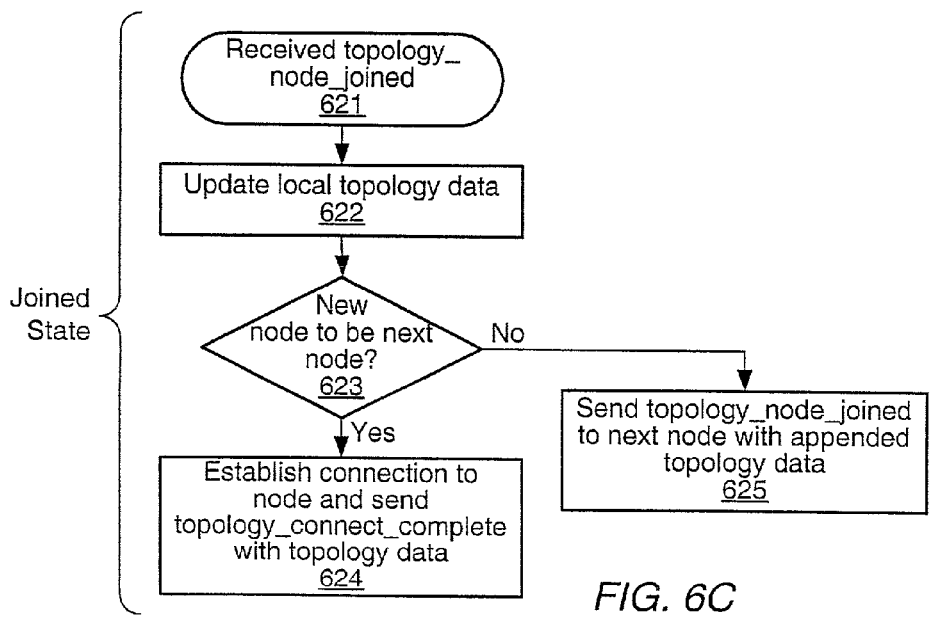

FIG. 6A is a flow chart illustrating a method for a node to join a cluster, for example node 502 as shown in FIG. 5, according to one embodiment. By way of example, FIGS. 6A–C are described referencing FIG. 5. In FIGS. 6A–C the vertical brackets indicate the states in which operations may take place according to one embodiment. While in the connecting state, the new node 502 may attempt to connect to a node according to a predefined order, such as described by a static topology, as indicated at 601. If the connection attempt is unsuccessful, the node may continue attempts to establish a connection to various nodes according to the predefined order, as indicated at 602. Once connected to another node, the node may transition to joining state. Node 502 in joining state may send a topology_connect_request message to the node with which it connected, as indicated at 603. Node 502 may then wait to receive a topology_connect_complete message, as indicated at 604, while waiting for the connection process to complete throughout the rest of the cluster. If node 502 receives a topology_connect_reject message, it may return to the connecting state and attempt connection to another node as indicated in the topology_connect_reject message. Upon receiving a topology_connect_complete message, node 502 may transition to joined state, update its local topology data according to information included with the topology_connect_complete, and send a topology_connect_complete message to the node with which it connected in connecting state (node 502's next node), as indicated at 605, to signal completion of the joining process.

FIG. 6B is a flow chart illustrating node (e.g. node 501C) responding to a new node (e.g. node 502) joining its cluster, according to one embodiment. Upon receiving a topology_connect_request message from the new node 502, as indicated at 611, the node 501C may determine whether the request would be in accordance with a predefined order (e.g. a static topology), as shown at 612. Node 501C may send a toplogy_connect_reject message to the new node if the connection is incorrect, as illustrated at 616, or transition to the transient state is the connection is proper. The node 501C may then send a topology_node_joined message to its next node in the cluster, as indicated at 613, to indicate the new node's request to other cluster members. Until it received a topology_connect_complete message, as indicated at 614, node 501C may remain in transient state where it may refuse other requests for cluster membership to prevent conflicts, as described above. After receiving a topology_connect_complete message, the node 501C may transition back to joined state, and may update its local topology data to reflect that the new node is now its new previous node in the cluster, as indicated at 615. In other embodiments, node 501C may update its local topology data in other states, for example after determining that the request conforms to a predefined ordering.

FIG. 6C is a flow chart illustrating node (e.g. node 501A, 501B or 501D), according to one embodiment, responding to a new node 502 joining its cluster. While in joined state, the node may receive a topology_node_joined message from its previous node in the cluster, as indicated at 621. The node may update its local topology data to reflect the data indicated in the topology_node_joined message it received (e.g. add the new node to the topology). The node may then determine if the new node 502 is to be its next node, as indicated at 623. If so, the node (e.g. node 501B) may connect to the new node 502 and send it a topology_connect_complete message including topology data, as indicated at 624. The topology data may be derived from topology data included in the topology_node_joined message node 501B received, as described above. Alternatively, node (e.g. node 501A or 501D) may forward the topology_node_joined message to its next node in the cluster, appending topology data such as its node identifier to the message, as indicated at 625.

FIGS. 7A–E and 8 illustrate a cluster 700 of nodes 701 handling the failure of cluster node 701D according to one embodiment. Nodes 701 may be in joined state 410C, as described in FIG. 4, and connected in a ring topology. The nodes 701 may consider one neighbor in the topology as a previous node and the other as a next node, so that for example node 701A may consider node 701D its previous node and node 701B its next node, node 701B may consider node 701A its previous node and node 701C its next node, node 701C may consider node 701B its previous node and node 701D its next node, and node 701D may consider node 701C its previous node and node 701A its next node. The cluster topology may match the static topology given the currently active nodes. Node 701D may fail in the cluster, for example from an internal error, due to communication problems, or other event preventing node 701D from operating as a member of the cluster 700. Node 701C and node 701A may be in joined state 410C when node 701D fails and may detect that failure as the neighbors of node 701D, as described above for FIG. 4.

Figure 7A:
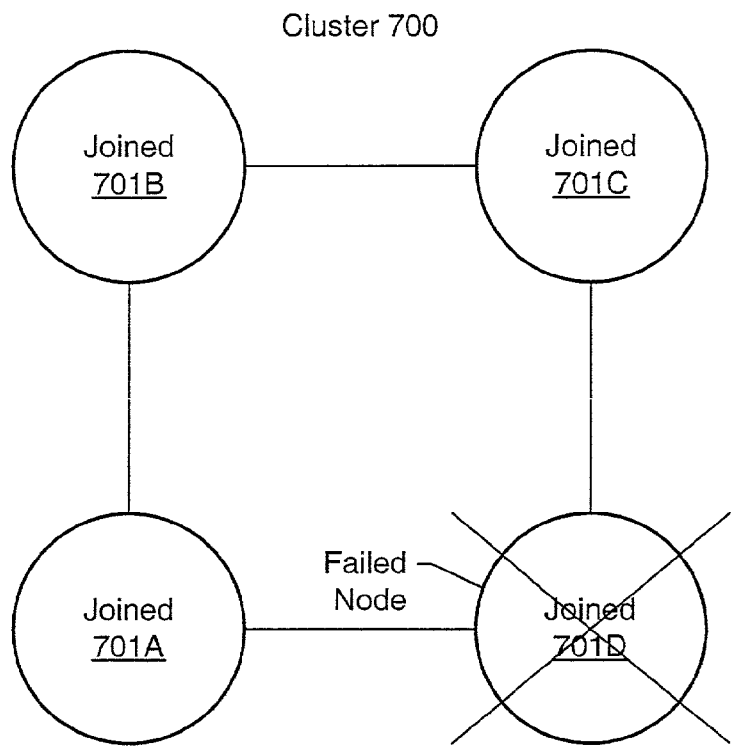
FIG. 7 illustrates a cluster responding to the death of one of its nodes, according to one embodiment.
Figure 7B:
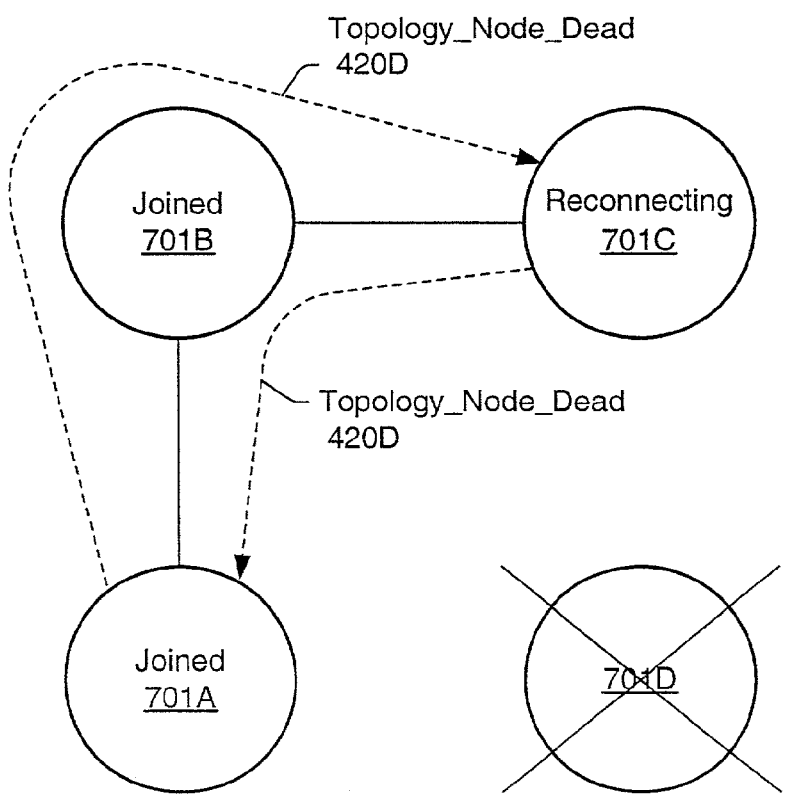

As shown in FIG. 7B, in accordance with FIG. 4 described above, nodes 701A and 701C, as the next node and previous node of the failed node, may propagate topology_node_dead messages in the cluster. Node 701A as the next node of the failed node 701D may send its topology_node_dead message to its next node, and node 701C as the previous node of the failed node 701D may send its topology_node_dead message to its previous node to ensure circulation of the information contained in the topology_node_dead messages to all cluster nodes 701. These messages are propagated around the cluster in opposite directions. Cluster nodes 701 may update their topology data in response to the topology information in the topology_node_dead messages received. As the previous node of the failed node, node 701C may enter reconnecting state 710E, as described above for FIG. 4, to reform the cluster topology.

Figure 7C:
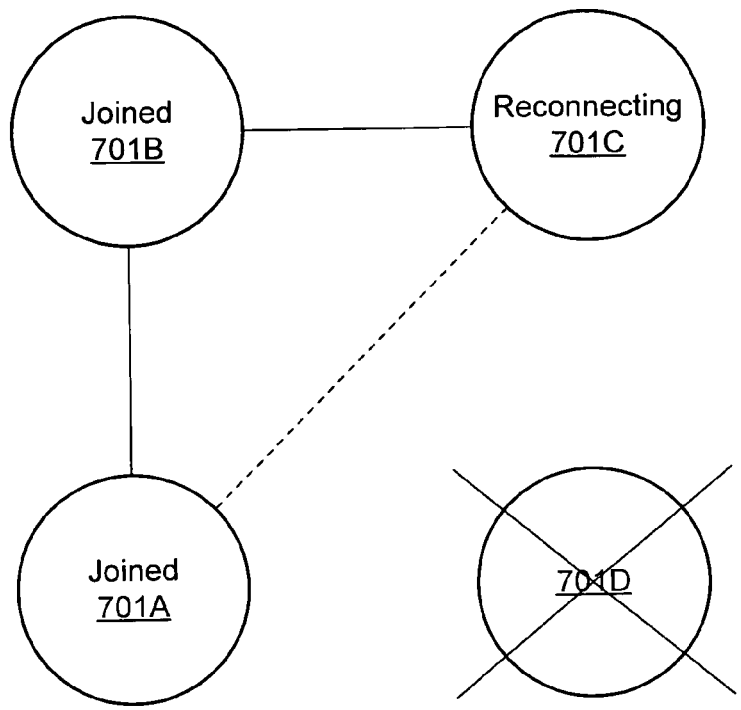

Following the description of FIG. 4, the node 701C in reconnecting state 710E may attempt to connect to the next node, node 701A, after the failed node. To maintain the static topology as illustrated in FIG. 7C, the previous node 701C of the failed node 701D connects to the next node 701A of the failed node. As described for FIG. 4, if the node 701C cannot connect to the dead node's 701D next node 701A, it may try other nodes 701 in the cluster and according to the static topology order until a connection may be established.

Figure 7D:
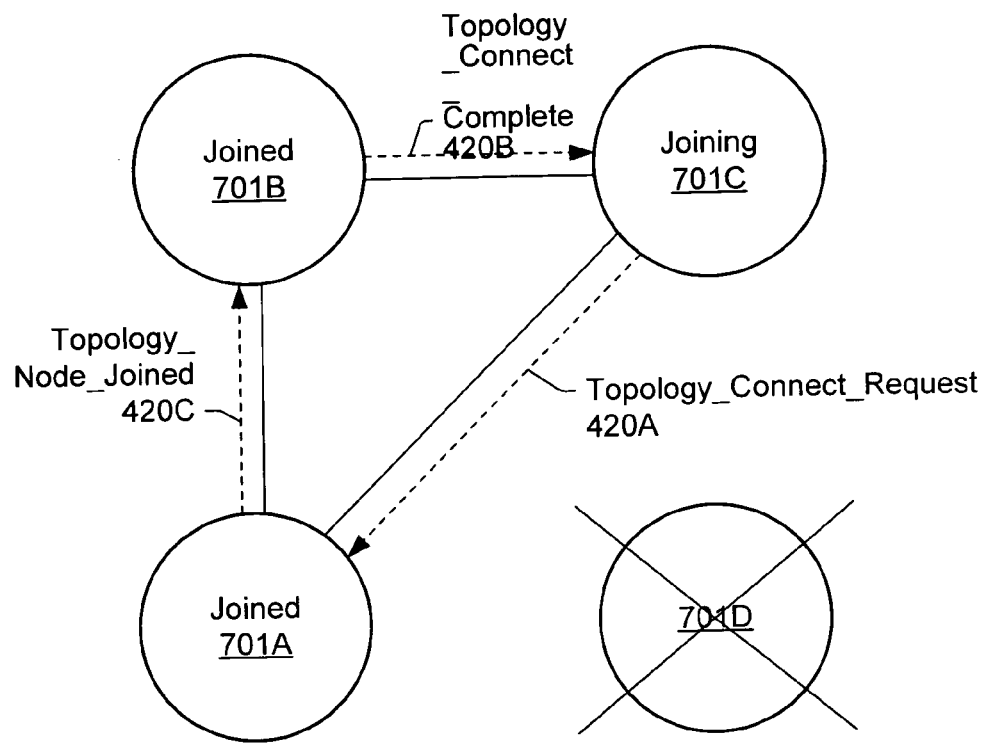

As illustrated in FIG. 7D, upon establishing a connection to node 701A, node 701C may transition to joining state 410B to reform the cluster topology through that connection, according to FIG. 4. Node 701C may then send a topology_connect_request message 420A to node 701A over the connection to request becoming its previous node in the topology, to replace node 701A's failed previous node 701D. As described above for FIG. 4, node 701A transitions to transient state 410D in response to receiving the topology_connect_request message 420A from node 701C.

Figure 7E:
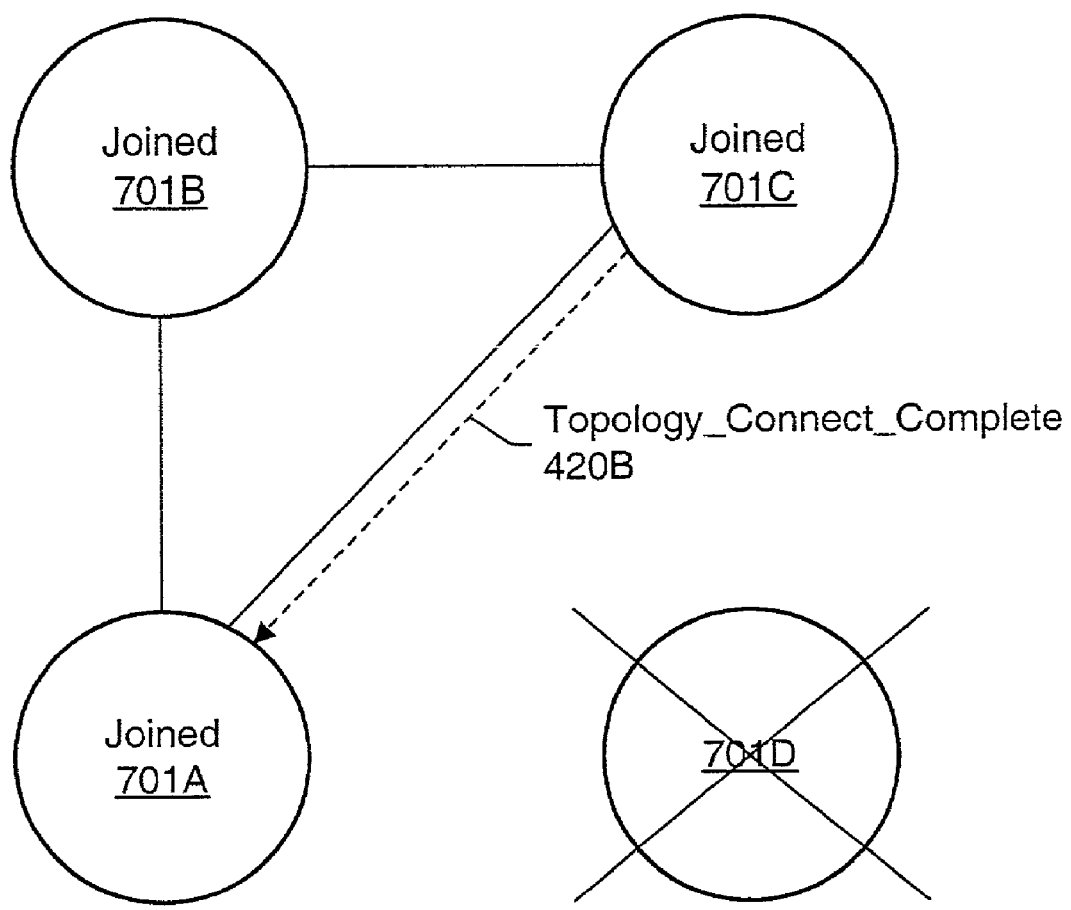

To continue the topology change requested by the topology_connect_request message 420A from node 701C as described for FIG. 4, node 701A may send a topology_node_joined message 420C to its next node 701B to inform it of the topology change. The topology_node_joined message 420C may circulate around the cluster, each node updating its topology data in response to receiving the message 420C, until it reaches the previous node 701B of the node 701C in reconnecting state 410E. Upon topology_node_joined message 420C reaching node 701B, all members of the cluster have data regarding the topology_connect_request message 420A sent by node 701C to node 701A. Node 701B may then send a topology_connect_complete message 420B to node 701C to indicate that the topology change is complete. As described above for FIG. 4, node 701C may send a topology_connect_compete message 420B to node 701A to communicate the complete status of the topology change. Nodes 701C and 701A may then transition to joined state 410C, as indicated in FIG. 7E, since the topology change has been processed successfully.

Figure 8A:
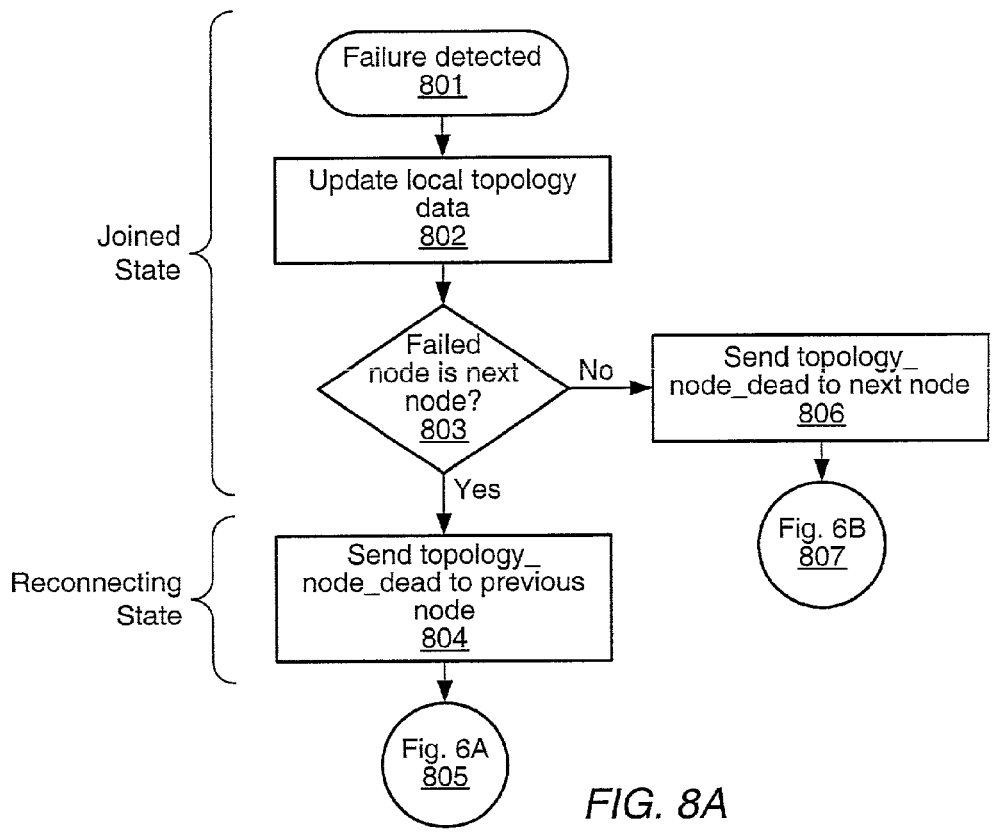
FIG. 8 is a flow chart illustrating a cluster responding to the death of one of its nodes as illustrated in FIG. 7, according to one embodiment.
Figure 8B:
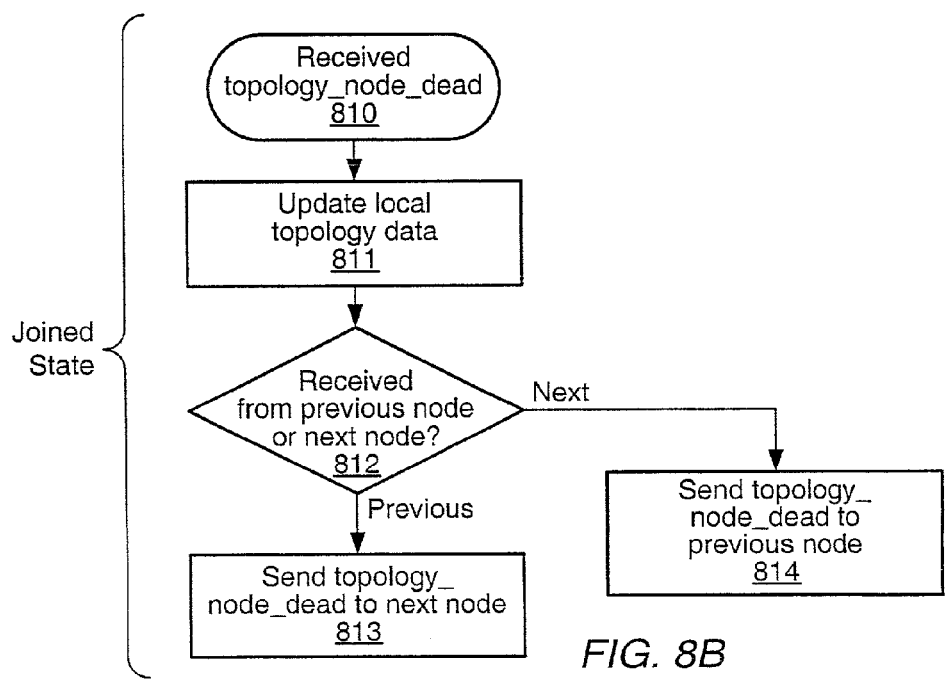

FIG. 8A is a flow chart illustrating nodes (e.g. nodes 701A and 701C) handling the failure of another node (e.g. node 701D) in their cluster, as shown in FIG. 7, according to one embodiment. In FIGS. 8A–B the vertical brackets indicate the states in which operations may take place according to one embodiment. While in joined state as indicated at 801, a node may detect the failure of it next or previous node, as described above. In one embodiment, the node detecting a failure may send a topology_node_ping message, as described above, to verify the death of a cluster node and proceed with the failure procedure only if it does not receive the topology_node_ping (meaning that the cluster is broken). The node detecting a failure may update its local topology data to reflect the death of a node, as indicated at 802. The node detecting the failure may then send a topology_node_dead message to its active neighbor in the topology. If the failed node was its next node, the node may send a topology_node_dead message to its previous node, as indicated at 803, 804. The node may also enter the reconnecting state, and proceed as described above for reconnecting state operation, as indicated at 805. To reconnect to a new next node, the node may follow a similar procedure to that described in FIG. 6A (although starting from the reconnecting state instead of the connecting state since it was already part of the cluster). Referring back to 803, if the failed node was its previous node, the node may send a topology_node_dead message to its next node and then follow a similar procedure to that described in FIG. 6B, as indicated at 807, to handle the reforming of the cluster.

When both neighbors (e.g. nodes 701A and 701C) of the failed node (e.g. node 701D) detect the node failure, they may send the topology_node_dead message in opposite directions in the cluster. FIG. 8B illustrates a node receiving a topology_node_dead message, as indicated at 810. After updating its local topology data, as indicated at 811, a node may determine in which direction to route the topology_node_dead message it received, as indicated at 812. The message may include a directional indication or the node may determine from which direction it was received. The message may then be routed either to its next node or previous node, as indicated at 813 and 814. In one embodiment, before updating its local topology data, a node receiving a topology_node_dead message may determine whether the message refers to its previous or next node that is still alive or to itself. If so, the receiving node may send a topology_connect_reject message to the node that sent the topology_node_dead message to indicate that the failure was wrongly declared.

In one embodiment, some tasks may occur in different states and transitions may occur differently between the states. For example, instead of sending to a cluster node a topology_connect_complete message 420B before transitioning to joined state 410C from joining state 410B, a node joining a cluster may send a topology_connect_complete message 420B after transitioning to joined state 410C. The described embodiments may also be extended, for example enabling a node to be a member of multiple clusters. To distinguish between a plurality of clusters, cluster numbers may be used in references to cluster specific messages, states, or other elements.

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

It will be appreciated by those of ordinary skill having the benefit of this disclosure that the illustrative embodiments described above are capable of numerous variations without departing from the scope and spirit of the invention. Various modifications and changes may be made as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A method, comprising:

a node in a connecting state attempting to connect to one of a plurality of cluster nodes as its next node, wherein the plurality of cluster nodes are connected together to form a distributed data cluster having a topology order;

upon connecting to its next node, the node transitioning to a joining state and sending a connect request message to its next node;

the node waiting in the joining state to receive a connect complete message; and upon receiving the connect complete message from one of a plurality of cluster nodes connecting to the node as its previous node, the node transitioning to a joined state as a member of the distributed data cluster;

wherein in the joined state the node is a member of the distributed data cluster in the topology order between its previous node and its next node.

2. The method as recited in claim 1, further comprising the node initially starting up in the connecting state before the node is a member of the distributed data cluster.

3. The method as recited in claim 1, wherein the node in a connecting state attempting to connect to one of a plurality of cluster nodes as its next node comprises the node attempting to connect to other nodes according to a predefined order, wherein the node attempts to connect to successive nodes from its position in the predefined order until a successful connection is established.

4. The method as recited in claim 1, wherein the node in a connecting state attempting to connect to one of a plurality of cluster nodes as its next node comprises the node opening a TCP/IP socket to its next node.

5. The method as recited in claim 1, wherein when the node is in the joining state, the node ignores any connection attempts by other nodes not already a member of the distributed data cluster.

6. The method as recited in claim 1, further comprising, after receiving the connect complete message from its previous node, the node sending the connect complete message to its next node to indicate that the node has successful joined the distributed data cluster.

7. The method as recited in claim 1, wherein the connect complete message received by the node includes a topology table indicating a current cluster membership, the method further comprising the node storing the topology table.

8. The method as recited in claim 1, wherein the transitions between the connecting, joining and joined states are managed by a topology manager of the node, wherein the node further comprises a distributed data manager for replicating data to one or more other nodes of the distributed data cluster.

9. The method as recited in claim 8, further comprising, upon transitioning to the joined state, the node's topology manager sending an event notification to the node's distributed data manager indicating that the node has joined the distributed data cluster.

10. The method as recited in claim 9, further comprising, after receiving the event notification indicating that the node has joined the distributed data cluster, the node's distributed data manager replicating data stored by the node to at least one of the node's next node and previous node.

11. A method, comprising:
a node in a joined state receiving a connect request message from a new node attempting to join a distributed data cluster, wherein the node in the joined state is a member of the distributed data cluster having a plurality of cluster nodes, wherein the node in the joined state is connected to one of the cluster nodes as its next node according to a cluster topology order;
after receiving the connect request message, the node transitioning to a transient state and sending a node joined message to its next node indicating that the new node is joining the distributed data cluster;
the node waiting in the transient state to receive a connect complete message from the new node; and
upon receiving the connect complete message from the new node, the node transitioning back to the joined state wherein the node is connected to the new node as its previous node in the cluster topology order.

12. The method as recited in claim 11, wherein the node in a joined state receiving a connect request message from a new node comprises the node verifying that the new node is connecting to it in a correct order as its previous node according to a predefined order, wherein if the new node is not connecting in the correct order, the node sending a connect reject message to the new node.

13. The method as recited in claim 12, wherein the connect reject message includes an indication of a correct one of the cluster nodes for the new node to connect to.

14. The method as recited in claim 11, further comprising, while in the transient state, the node refusing any connect request messages from other nodes by replying with a connect reject message.

15. The method as recited in claim 11, further comprising the node ignoring any connect request messages from other nodes while the node is in the transient state.

16. The method as recited in claim 11, wherein the node joined message sent by the node to its next node includes an indication that the new node is now the node's previous node.

17. The method as recited in claim 11, further comprising, upon receiving the connect complete message from the new node, the node dropping its connection to one of the cluster nodes that was its former previous node.

18. A method, comprising:
a node in a joined state receiving a node joined message indicating a new node is attempting to join a distributed data cluster, wherein the node in the joined state is a member of the distributed data cluster having a plurality of cluster nodes, wherein the node in the joined state receives the node joined message from one of the cluster nodes connected to it as its previous node according to a cluster topology order, and wherein the node is connected to another cluster node as its current next node according to the cluster topology order;
if the node joined message indicates that the new node is to be the node's new next node, the node connecting to the new node and sending the new node a connect complete message; and
if the node joined message does not indicate that the new node is to be the node's new next node, the node sending the node joined message to its current next node.

19. The method as recited in claim 18, further comprising, if the received node joined message indicates that the new node is to be the node's new next node, the node dropping its connection to its current next node.

20. The method as recited in claim 18, wherein the node connecting to the new node comprises the node opening a TCP/IP socket to the new node.

21. The method as recited in claim 18, further comprising, if the received node joined message indicates that the new node is to be the node's new next node, the node updating a topology table to indicate that the new node is now its next node.

22. The method as recited in claim 18, further comprising, if the received node joined message indicates that the new node is to be the node's new next node, the node appending its node identifier to a topology table included with the received node joined message so that the topology table indicates that the new node is now the node's next node in the cluster topology order.

23. The method as recited in claim 22, wherein the connect complete message sent by the node to the new node includes the topology table appended with the node's node identifier and indicating that the new node is now the node's next node in the cluster topology order.

24. The method as recited in claim 18, further comprising, if the received node joined message does not indicate that the new node is to be the node's new next node, the node appending its node identifier to a topology table included with the node joined message so that the topology table indicates the node's position in the cluster topology order.

25. The method as recited in claim 24, wherein the node joined message sent by the node to its current next node includes the topology table appended with the node's node identifier.

26. A computer system comprising a processor and memory including instructions executable by the processor for:
  a node in a connecting state attempting to connect to one of a plurality of cluster nodes as its next node, wherein the plurality of cluster nodes are connected together to form a distributed data cluster having a topology order;
  upon connecting to its next node, the node transitioning to a joining state and sending a connect request message to its next node;
  the node waiting in the joining state to receive a connect complete message; and
  upon receiving the connect complete message from one of a plurality of cluster nodes connecting to the node as its previous node, the node transitioning to a joined state as a member of the distributed data cluster;
  wherein in the joined state the node is a member of the distributed data cluster in the topology order between its previous node and its next node.

27. The computer system as recited in claim 26, further comprising the node initially starting up in the connecting state before the node is a member of the distributed data cluster.

28. The computer system as recited in claim 26, wherein the node in a connecting state attempting to connect to one of a plurality of cluster nodes as its next node comprises the node attempting to connect to other nodes according to a predefined order, wherein the node attempts to connect to successive nodes from its position in the predefined order until a successful connection is established.

29. The computer system as recited in claim 26, wherein the node in a connecting state attempting to connect to one of a plurality of cluster nodes as its next node comprises the node opening a TCP/IP socket to its next node.

30. The computer system as recited in claim 26, wherein when the node is in the joining state, the node ignores any connection attempts by other nodes not already a member of the distributed data cluster.

31. The computer system as recited in claim 26, further comprising, after receiving the connect complete message from its previous node, the node sending the connect complete message to its next node to indicate that the node has successfully joined the distributed data cluster.

32. The computer system as recited in claim 26, wherein the connect complete message received by the node includes a topology table indicating a current cluster membership, the method further comprising the node storing the topology table.

33. The computer system as recited in claim 26, wherein the transitions between the connecting, joining and joined states are managed by a topology manager of the node, wherein the node further comprises a distributed data manager for replicating data to one or more other nodes of the distributed data cluster.

34. The computer system as recited in claim 33, further comprising, upon transitioning to the joined state, the node's topology manager sending an event notification to the node's distributed data manager indicating that the node has joined the distributed data cluster.

35. The computer system as recited in claim 34, further comprising, after receiving the event notification indicating that the node has joined the distributed data cluster, the node's distributed data manager replicating data stored by the node to at least one of the node's next node and previous node.

36. A computer system comprising a processor and memory including instructions executable by the processor for:
  a node in a joined state receiving a connect request message from a new node attempting to join a distributed data cluster, wherein the node in the joined state is a member of the distributed data cluster having a plurality of cluster nodes, wherein the node in the joined state is connected to one of the cluster nodes as its next node according to a cluster topology order;
  after receiving the connect request message, the node transitioning to a transient state and sending a node joined message to its next node indicating that the new node is joining the distributed data cluster;
  the node waiting in the transient state to receive a connect complete message from the new node; and
  upon receiving the connect complete message from the new node, the node transitioning back to the joined state wherein the node is connected to the new node as its previous node in the cluster topology order.

37. The computer system as recited in claim 36, wherein the node in a joined state receiving a connect request message from a new node comprises the node verifying that the new node is connecting to it in a correct order as its previous node according to a predefined order, wherein if the new node is not connecting in the correct order, the node sending a connect reject message to the new node.

38. The computer system as recited in claim 37, wherein the connect reject message includes an indication of a correct one of the cluster nodes for the new node to connect to.

39. The computer system as recited in claim 36, further comprising, while in the transient state, the node refusing any connect request messages from other nodes by replying with a connect reject message.

40. The computer system as recited in claim 36, further comprising the node ignoring any connect request messages from other nodes while the node is in the transient state.

41. The computer system as recited in claim 36, wherein the node joined message sent by the node to its next node includes an indication that the new node is now the node's previous node.

42. The computer system as recited in claim 36, further comprising, upon receiving the connect complete message from the new node, the node dropping its connection to one of the cluster nodes that was its former previous node.

43. A computer system comprising a processor and memory including instructions executable by the processor for:
  a node in a joined state receiving a node joined message indicating a new node is attempting to join a distributed data cluster, wherein the node in the joined state is a member of the distributed data cluster having a plurality of cluster nodes, wherein the node in the joined state receives the node joined message from one of the cluster nodes connected to it as its previous node according to a cluster topology order, and wherein the node is connected to another cluster node as its current next node according to the cluster topology order;

if the node joined message indicates that the new node is to be the node's new next node, the node connecting to the new node and sending the new node a connect complete message; and if the node joined message does not indicate that the new node is to be the node's new next node, the node sending the node joined message to its current next node.

44. The computer system as recited in claim 43, further comprising, if the received node joined message indicates that the new node is to be the node's new next node, the node dropping its connection to its current next node.

45. The computer system as recited in claim 43, wherein the node connecting to the new node comprises the node opening a TCP/IP socket to the new node.

46. The computer system as recited in claim 43, further comprising, if the received node joined message indicates that the new node is to be the node's new next node, the node updating a topology table to indicate that the new node is now its next node.

47. The computer system as recited in claim 43, further comprising, if the received node joined message indicates that the new node is to be the node's new next node, the node appending its node identifier to a topology table included with the received node joined message so that the topology table indicates that the new node is now the node's next node in the cluster topology order.

48. The computer system as recited in claim 47, wherein the connect complete message sent by the node to the new node includes the topology table appended with the node's node identifier and indicating that the new node is now the node's next node in the cluster topology order.

49. The computer system as recited in claim 43, further comprising, if the received node joined message does not indicate that the new node is to be the node's new next node, the node appending its node identifier to a topology table included with the node joined message so that the topology table indicates the node's position in the cluster topology order.

50. The computer system as recited in claim 49, wherein the node joined message sent by the node to its current next node includes the topology table appended with the node's node identifier.

51. A method for managing cluster membership in a distributed data system according to a finite state automata, comprising:

a first node in a connecting state attempting to connect to a second node of a plurality of cluster nodes as its next node, wherein the plurality of cluster nodes are connected together to form a distributed data cluster having a cluster topology order;

upon connecting to the second node, the first node transitioning to a joining state and sending a connect request message to the second node;

the first node waiting in the joining state to receive a connect complete message;

the second node in a joined state receiving the connect request message from the first node, wherein the second node is connected to a third node of the cluster nodes as the third node's next node according to the cluster topology order;

after receiving the connect request message, the second node transitioning to a transient state and sending a node joined message to its next node indicating that the first node is joining the distributed data cluster;

the second node waiting in the transient state to receive a connect complete message from the first node;

the third node in a joined state receiving the node joined message indicating the first node is attempting to join the distributed data cluster as the third node's new next node, wherein the third node receives the node joined message from one of the cluster nodes connected to it as its previous node according to the cluster topology order;

in response to the node joined message indicating that the first node is to be the third node's new next node, the third node connecting to the first node and sending the first node a connect complete message;

upon receiving the connect complete message from the third node, the first node connecting to the third node as its previous node, sending a connect complete message to the second node, and transitioning to a joined state as a member of the distributed data cluster; and upon receiving the connect complete message from the first node, the second node transitioning to the joined state wherein the second node is connected to the first node as the first node's previous node in the cluster topology order;

wherein in the joined state the first node is a member of the distributed data cluster in the cluster topology order between its previous node and its next node.

52. The method as recited in claim 51, further comprising the first node initially starting up in the connecting state before the node is a member of the distributed data cluster.

53. The method as recited in claim 51, wherein the second node receiving a connect request message from a first node comprises the second node verifying that the first node is connecting to it in a correct order as its previous node according to a predefined order, wherein if the first node is not connecting in the correct order, the second node sending a connect reject message to the first node.

* * * * *